United States Patent
Kennedy

(10) Patent No.: US 8,291,446 B2
(45) Date of Patent: Oct. 16, 2012

(54) SYSTEMS AND METHODS FOR PROVIDING CONTENT BASED UPON CONSUMER PREFERENCES

(75) Inventor: John T. Kennedy, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 476 days.

(21) Appl. No.: 12/023,559

(22) Filed: Jan. 31, 2008

(65) Prior Publication Data

US 2009/0199227 A1 Aug. 6, 2009

(51) Int. Cl.
  H04H 60/33 (2008.01)
  H04H 60/32 (2008.01)
  H04N 7/173 (2006.01)
  H04N 5/445 (2006.01)
  H04N 7/20 (2006.01)
  G06F 3/00 (2006.01)
  G06F 13/00 (2006.01)

(52) U.S. Cl. .......... 725/13; 725/9; 725/16; 725/24; 725/37; 725/105

(58) Field of Classification Search ............ 725/32
  See application file for complete search history.

(56) References Cited

U.S. PATENT DOCUMENTS

| | | | |
|---|---|---|---|
| 5,631,694 A * | 5/1997 | Aggarwal et al. .......... | 725/93 |
| 6,909,726 B1 | 6/2005 | Sheeran | |
| 6,947,966 B1 * | 9/2005 | Oko et al. .......... | 709/203 |
| 7,236,738 B2 | 6/2007 | Settle | |
| 7,260,601 B1 | 8/2007 | Day et al. | |
| 2003/0037331 A1 | 2/2003 | Lee | |
| 2004/0015998 A1 * | 1/2004 | Bokor et al. .......... | 725/136 |
| 2004/0203374 A1 | 10/2004 | Zilliacus | |
| 2005/0037706 A1 | 2/2005 | Settle | |
| 2007/0204310 A1 * | 8/2007 | Hua et al. .......... | 725/88 |
| 2008/0060039 A1 * | 3/2008 | Kim et al. .......... | 725/115 |
| 2008/0098417 A1 * | 4/2008 | Hatamian et al. .......... | 725/24 |
| 2008/0177994 A1 * | 7/2008 | Mayer .......... | 713/2 |
| 2008/0307469 A1 | 12/2008 | Swix et al. | |
| 2009/0025027 A1 * | 1/2009 | Craner .......... | 725/32 |
| 2009/0276815 A1 | 11/2009 | Casagrande | |

FOREIGN PATENT DOCUMENTS

| | | | |
|---|---|---|---|
| TW | 242379 B | | 10/2005 |
| WO | WO 2007060577 A1 | * | 5/2007 |
| WO | 2007103655 A2 | | 9/2007 |
| WO | WO 2007/103655 A | | 9/2007 |

OTHER PUBLICATIONS

U.S. Appl. No. 12/112,920, filed Apr. 30, 2008 in the name of Steven M. Casagrande.

(Continued)

Primary Examiner — Justin Shepard
(74) Attorney, Agent, or Firm — Ingrassia Fisher & Lorenz, P.C.

(57) ABSTRACT

Systems and methods allow for the distribution of a requested program to a consumer device via a high-bandwidth connection. Consumers cast votes for requested programs via communications channels other than the high-bandwidth connection. A portion of the high-bandwidth connection is allocated to a number of programs, including the requested program. An instruction is subsequently transmitted to the consumer device to thereby allow the consumer device to receive the requested program from the allocated portion of the high-bandwidth connection.

20 Claims, 3 Drawing Sheets

OTHER PUBLICATIONS

Figure 1:
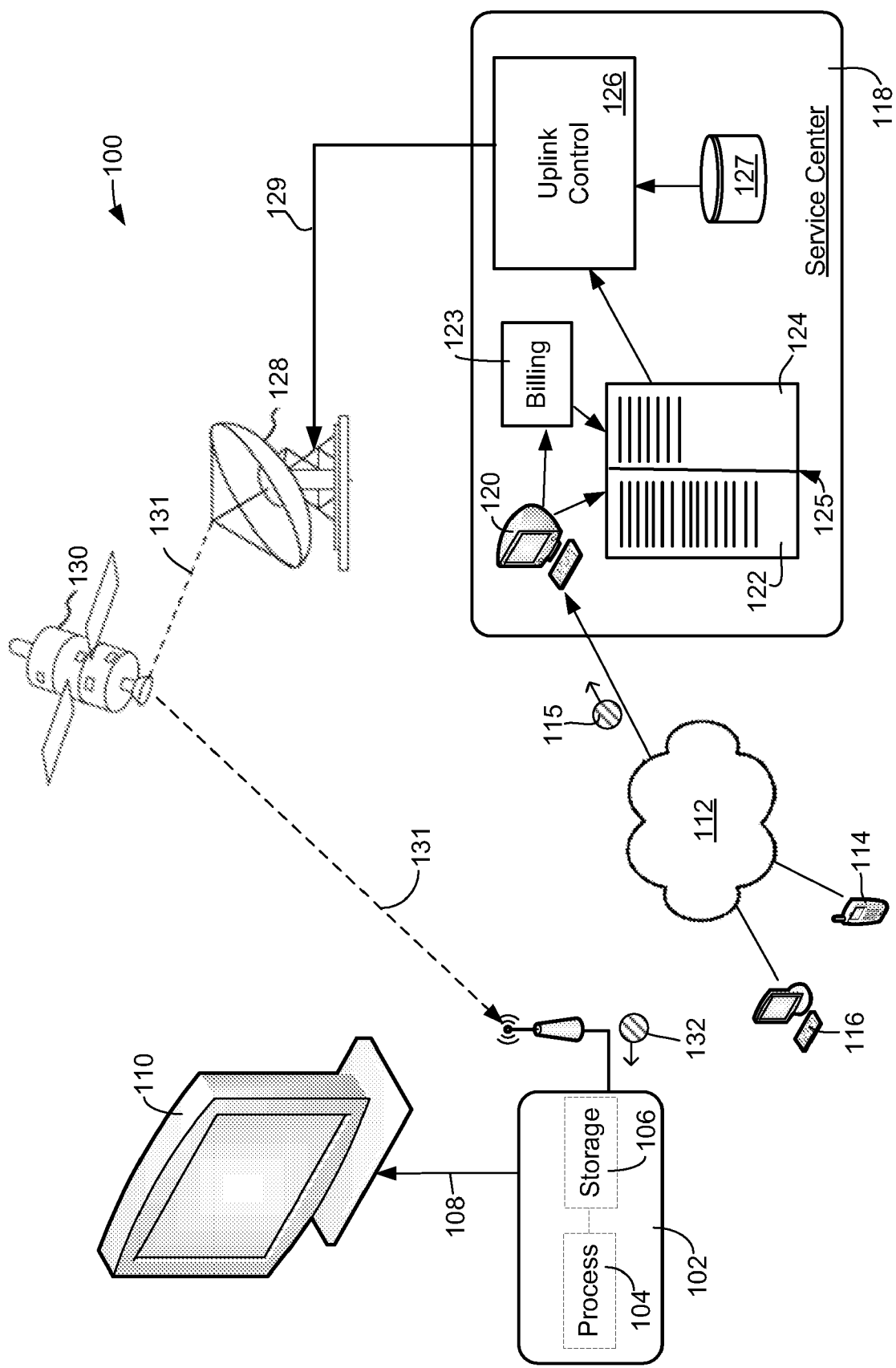

Hibberd, James "DirectTV Plans 2,000 VOD Titles," TV Week website, Apr. 12, 2007, http://www.tvweek.com/cgi-bin/mt/mt-tb.cgi/2148.

Agrawal, Mukesh et al. "Improving Web Performance in Broadcast-Unicast Networks," Apr. 2003, IEEE INFOCOM 2003, XP002541070, paragraph [0001]-paragraph [0004].

European Patent Office, International Searching Authority, "International Search Report and Written Opinion," mailed Aug. 21, 2009; International Application No. PCT/US2009/041568, filed Apr. 23, 2009.

USPTO "Non-Final Office Action" mailed Oct. 13, 2010; U.S. Appl. No. 12/112,920, filed Apr. 30, 2008.

USPTO "Non-Final Office Action" mailed Nov. 18, 2011; U.S. Appl. No. 12/112,920, filed Apr. 30, 2008.

USPTO "Final Office Action" mailed Apr. 30, 2012; U.S. Appl. No. 12/112,920, filed Apr. 30, 2008.

* cited by examiner

SYSTEMS AND METHODS FOR PROVIDING CONTENT BASED UPON CONSUMER PREFERENCES

TECHNICAL FIELD

The present invention generally relates to content distribution, and more particularly relates to systems and methods for providing content over a high-bandwidth connection based upon consumer preferences.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box or other consumer device. The decoded signals can then be viewed on a television or other appropriate display as desired by the viewer.

Although consumers have reacted very favorably to aggregated television content, issues often remain in providing two-way communications between consumer devices and the content aggregator. Conventional set-top boxes, for example, are often unable to transmit via the same link that is used to receive content, particularly if the receiving link is satellite based. Although efforts have been made to provide some sort of back channel communication via dial-up telephone links or the like, many of consumer devices still do not maintain such capabilities. Moreover, even for devices that do include some limited back-channel communications, these communications are often slow, intermittent and/or otherwise undesirable for certain purposes.

In particular, it has been inconvenient to implement an "on demand"-type of content service via many aggregated television systems. Although satellite and other aggregated services are capable of providing significant amounts of bandwidth on the downlink to the consumer device, this bandwidth is nevertheless limited at some point. The limits in downlink bandwidth, coupled with the frequent inconvenience of receiving back channel communications from the consumer, can make subscription-based or on-demand content services difficult to implement in practice.

It is therefore desirable to create systems and processes for providing content via a high-bandwidth connection based upon consumer preferences. These and other desirable features and characteristics will become apparent from the subsequent detailed description and the appended claims, taken in conjunction with the accompanying drawings and this background section.

BRIEF SUMMARY

In various embodiments, systems and methods allow for the distribution of a requested program to a consumer device via a high-bandwidth connection. Consumers cast votes for requested programs via telephone, text message, email, Internet and/or other communications channels other than the high-bandwidth connection. A portion of the high-bandwidth connection is allocated to a number of programs, including the requested program. An instruction is subsequently transmitted to the consumer device to thereby allow the consumer device to receive the requested program from the allocated portion of the high-bandwidth connection.

In other embodiments, systems are provided for distributing a plurality of programs to a plurality of consumer devices via a high-bandwidth connection. The system comprises an interface to a communications channel separate from the high-bandwidth connection, wherein the interface is configured to receive votes for the plurality of programs. A queuing system is configured to allocate the plurality of programs broadcast on a portion of the high-bandwidth connection based upon the votes received via the interface. An uplink control system is configured to broadcast the allocated plurality of programs on the portion of the high-bandwidth connection for reception by the consumer devices.

In still other embodiments, a method of distributing a plurality of programs to a plurality of consumer devices via a high-bandwidth connection is provided. A plurality of votes is received for each of the plurality of programs via a communications channel separate from the high-bandwidth connection. A portion of the high-bandwidth connection is allocated to the plurality of programs based upon the plurality of votes received. Instructions are transmitted to each of the plurality of consumer devices via the high-bandwidth connection to thereby allow each of the plurality of consumer devices to receive selected ones of the plurality of programs via the portion of the high-bandwidth connection, wherein the selected ones of the plurality of programs are associated with votes submitted by a consumer of the consumer device.

Various other embodiments, aspects and other features are described in more detail below.

BRIEF DESCRIPTION OF THE DRAWING FIGURES

Figure 2:
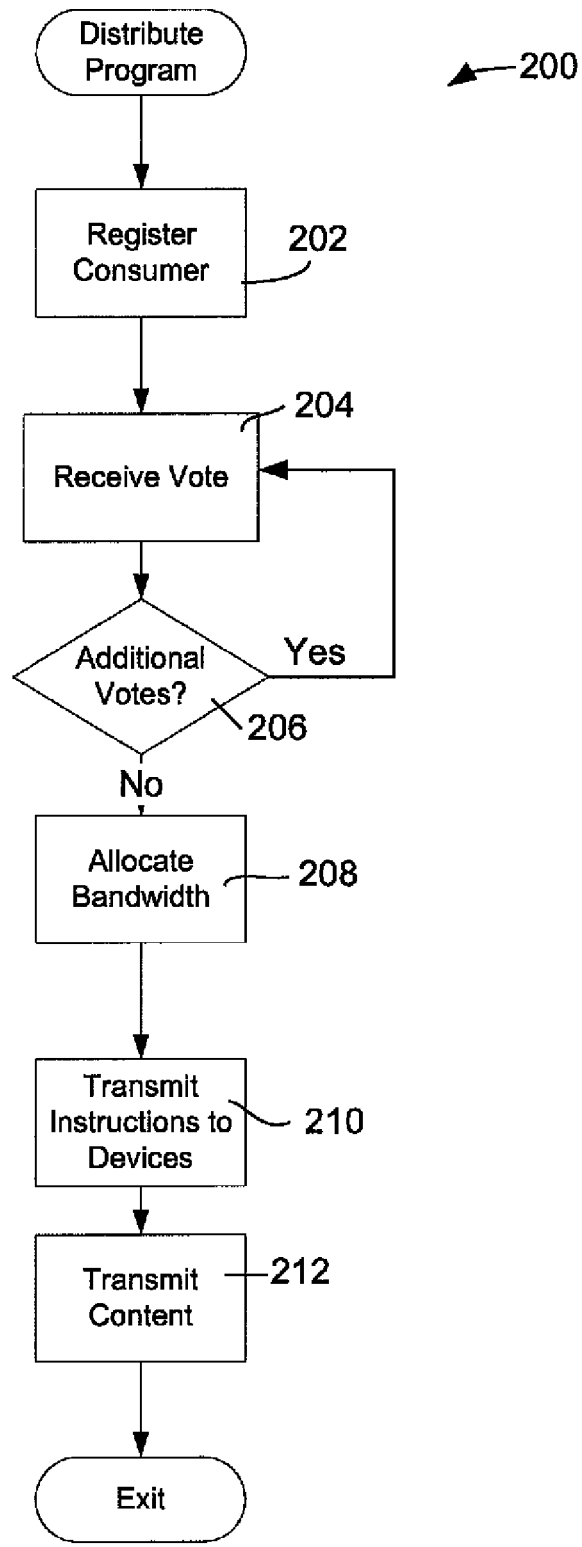
Figure 3:
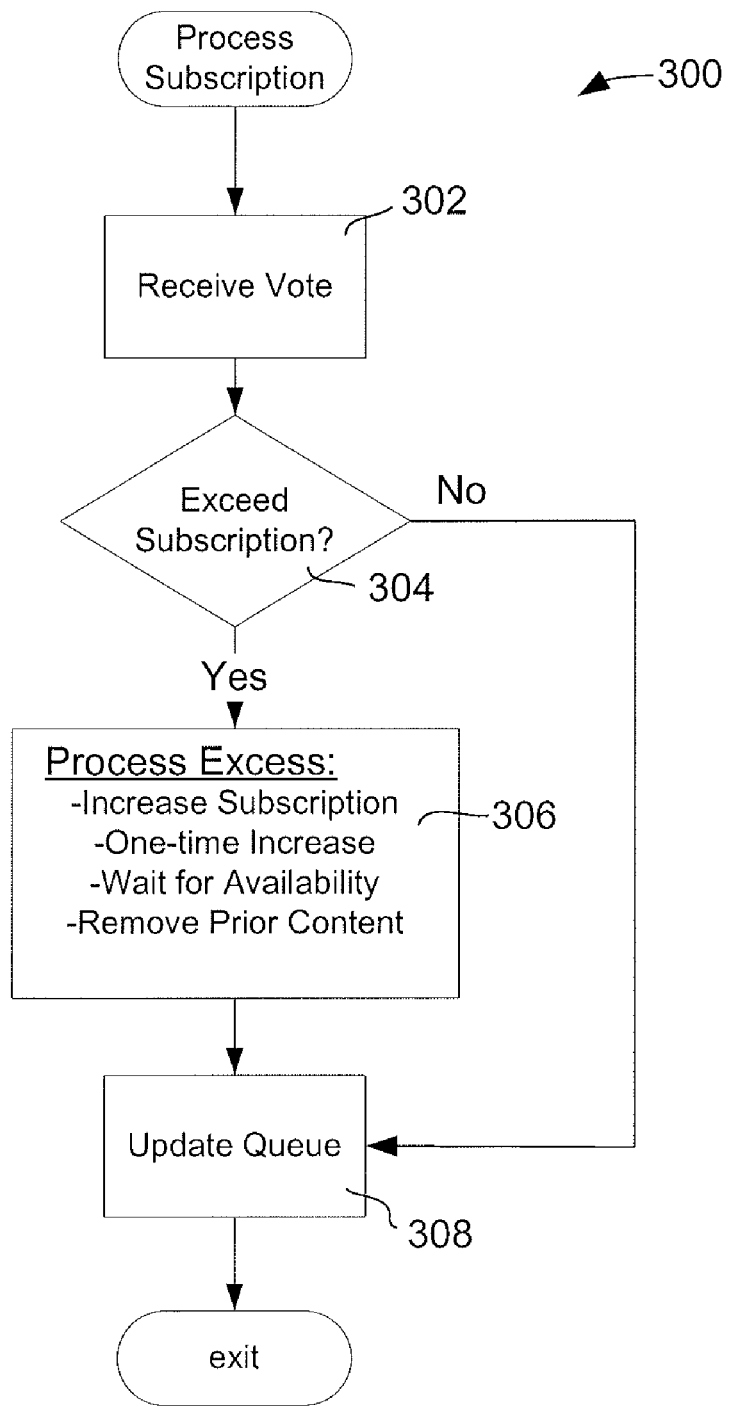

Exemplary embodiments will hereinafter be described in conjunction with the following drawing figures, wherein like numerals denote like elements, and FIG. 1 is a diagram of an exemplary system for distributing content to consumers based upon consumer-preferences;

FIG. 2 is a flowchart of an exemplary process for distributing content based upon consumer-preferences; and FIG. 3 is a flowchart of an exemplary subscription service.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, difficulties in providing content based upon consumer preferences or selections are overcome through the use of content "voting". Consumers may cast votes for television programs, movies and/or other content via any media. In a basic embodiment, the votes can indicate to a central service center that the consumer is interested in receiving the selected content, so an instruction can be sent via a satellite, cable, wireless or other high-bandwidth link that allows the voter's set-top box or other device to receive and/or record the selected program. In further embodiments, votes from a number of consumers can be tallied and maintained to determine which programs should be provided on the high-bandwidth link. The most popular programs may be provided more frequently, for example, or at a higher resolution than less popular programs, to ensure that the bandwidth is used most efficiently for the greatest number of consumers. Votes may be cast on any basis; in some embodiments, consumers may be allowed an unlimited number of votes. In other embodiments, the content aggregator or other service provider may charge a fee for votes, and/or may allow a particular number of votes as part of a subscription service. Other embodiments may incorporate advertising in place of fee collection, and/or may supplement fees received with advertisements. Many other aspects of various embodiments are described in additional detail below.

With reference now to the drawing figures and with initial reference to FIG. 1, an exemplary system 100 for distributing consumer-selected content based upon consumer preferences suitably includes a service center 118 that is able to receive a vote 115 from a consumer, to allocate programming on the high-bandwidth link 131, and to provide instructions 132 to consumer devices 102 that allow the devices 102 to receive and store selected content from the high-bandwidth link 131. Content may be viewed from consumer device 102 on a television or other display 110 as appropriate.

Consumer device 102 is any appliance or other device that is capable of receiving a high-bandwidth signal 131 and demodulating signals 108 from signal 131 for viewing on display 110. In various embodiments, consumer device 102 is a set-top box or the like that typically includes a conventional processor 104, as well as a memory, hard disk or other storage device 106. Device 102 may incorporate digital and/or analog television demodulation features, personal video recorder (PVR) capabilities, video games or other entertainment features, and/or other capabilities as desired. In various embodiments, device 102 includes or communicates with any type of additional mass storage, including any sort of internal or external magnetic or optical hard drives, flash memory and/or the like.

In addition to receiving signals 131 from a satellite 130 or other transmitter, device 102 is generally able to receive instructions 132 from a service center 118 as appropriate. These instructions are generally contained within signals 131, and may be keyed to a unique identifier associated with the particular device 102. Upon receiving an instruction in signal 131 that includes the device's identifier, then, device 102 is able to respond to individualized instructions from service center 118. Such instructions may be cryptographically encoded or otherwise protected to prevent tampering or other unauthorized behavior.

To receive individualized programming, device 102 may receive an instruction 132 via signal 131 that instructs the device 102 to record or otherwise receive content that is broadcast on a particular channel of signal 131 at a particular time. This content may be encrypted, copy protected and/or the like, and any necessary keys or other passwords necessary for viewing or recording the program may be provided within instruction 132. Device 102 is able to process the instruction 132 using processor 104 to receive the content and/or to store the content (e.g., in storage 106) as appropriate. In various embodiments, device 102 is also able to erase or otherwise remove content in response to subsequent instructions 132. By providing instructions 132 from service center 118 via signal 131, consumer device 102 can be made to receive, store, remove or otherwise process particular content in a secure manner.

Service center 118 is any centralized or distributed data center, operations center, server or other central processor, or combination thereof that is capable of receiving votes 115 from consumers and transmitting instructions 132 to devices 102 associated with the voting consumers to allow consumers to view their preferred and selected content. In the exemplary embodiment shown in FIG. 1, service center 118 includes an interface 120 to a communications channel 112 that is separate from the high-bandwidth link 131, as well as a queuing system 125, a billing system 123 and an uplink control 126 as appropriate. In various embodiments, votes received from consumers via interface 120 are used to allocate bandwidth on link 131 using various queues 125. Service center 118 may also contain a database 127 or other repository of available content that can be retrieved and broadcast on link 131 in accordance with information contained in queues 125.

Interface 120 is any system, module or other logic capable of receiving votes 115 from various consumers via any communications channel 112. In various embodiments, communications channel 112 is any sort of telephone and/or data network, such as the Internet. Interface 120 therefore receives votes 115 via any type of telephone, text message (e.g. short message service (SMS)), email, web-based message, instant message and/or other communication as desired. Consumers may therefore cast votes from any telephone 114, computer system 116, personal digital assistant, appliance and/or the like. Interface 120 may additionally incorporate a conventional call center function whereby a human or automated operator receives votes 115 via telephone, text message, email or any other medium, and enters the votes 115 into a computer system or the like for subsequent processing.

Billing system 123 is any system, logic or the like capable of processing billing, payment and/or subscription services associated with votes 115. In various embodiments, billing system 123 is an interface to a conventional credit card or other payment system so that a "per vote" charge can be applied to the voter. Such charges may be on the order of $1.00 or so in various embodiments, although costs may vary significantly from embodiment to embodiment. In certain embodiments, billing features associated with billing system 123 may be incorporated within interface 120 so that costs of voting are directly billed to the voter's communications service. A voter's telephone account may be charged for sending a vote via text message or phone call, for example, or an internet payment service (e.g. the PAYPAL service or the like) could be invoiced for votes received over internet media. Alternately, billing for votes and/or downloads could be added to a subscriber's monthly (or other periodic) billing statement from the content aggregator.

In other embodiments, billing system 123 maintains a subscription service whereby consumers are allowed a limited number of votes and/or a limited number of programs over a particular period of time. In exchange for a periodic fee (e.g. a monthly or annual fee), for example, consumers may be allowed to vote for any particular number of content programs, and/or to maintain any particular number of programs in storage on their associated consumer device 102. The particular parameters of any subscription service may be variable based upon the fees collected from the consumer, consumer loyalty, and/or any other factor, and may be adjusted with time. In one exemplary embodiment, a consumer may pay a monthly charge that allows an unlimited number of content votes 115, but restricts the number of programs stored on the consumer's device 102 to a limited number (e.g. three concurrent programs). When the consumer requests additional programs beyond the limited number, older programs may be deleted on the consumer's device 102, or additional programs may be withheld until the consumer frees up space for additional downloads. In still other embodiments, the consumer may be prompted (through a pop-up display generated by device 120, or through a phone call, text message, email or other communication via any other medium) to expand the subscription (potentially for an additional fee) to allow more content to be retrieved. Additional detail about an exemplary subscription service is provided below in the discussion accompanying FIG. 3.

Not all embodiments will incorporate subscription-based services; to the contrary, some embodiments may charge fees on a per-vote and/or per-download basis as described above. In still other embodiments, votes are allowed without monetary charge, in which case system 100 may present advertisements to the viewer and/or extract value from the system in other ways. Several processes for extracting value from voting, advertising and/or downloading are described more fully below.

Queuing system 125 is any hardware, software and/or other logic capable of maintaining lists of content to be provided on high-bandwidth link 131 and of consumer devices 102 that are to receive access to such content. Queuing system 125 may be incorporated with any sort of conventional list processing logic executable on a digital computer having a processor, mass storage and other conventional features as appropriate. In the embodiment shown in FIG. 1, queuing system 125 maintains two separate queues 122 and 124, corresponding to a program queue 122 and a voter queue 124. Both queues 122 and 124 may be created and updated based upon received votes 115; alternately, program queue 122 may be relatively static, with votes 115 received based upon listed programs as described more fully below.

Voter queue 122 maintains a list of content programs that are to be downloaded to particular consumer devices 102. In various embodiments, voter queue 122 maintains a mapping of identifiers for particular devices 102, along with listings of programs that are to be received by that particular device. In general, queue 122 maintains sufficient information to allow instructions 132 to be formulated that will enact the receipt, storage, deletion and/or other actions taken by the voter's associated device 102. This information may be created according to any rules or logic, depending upon the implemented business plan, the consumer's subscription or account status, or any other appropriate factors. In embodiments wherein votes 115 are intended to result in downloading of the selected content, for example, voter queue 122 will typically maintain an indication of the voter's device identifier, as well as an indication of the content (e.g. a title, broadcast time/channel or other identifier) so that a download instruction 132 can be sent to the particular device prior to the broadcast time of the selected content.

Program queue 124 maintains a listing of programs that are to be broadcast on high-bandwidth link 131. As noted above, program queue 124 may be relatively static in some embodiments, with consumers allowed to vote only on programs that are already pre-determined to be broadcast. In such embodiments, queue 124 may be redundant to other programming queues (e.g. programming schedules maintained in uplink control 126), so a separate queue 124 in queuing system 125 may not be needed or present. In other embodiments, however, queue 124 is dynamically adjusted in response to votes 115 that are received at interface 120. Votes 115 may be tallied over time, for example, to allow the most popular programs to be broadcast first, or most frequently, and/or at a higher resolution than less popular programs. This allows the limited bandwidth of link 131 to be used most efficiently for the benefit of the most consumers. Less popular programming choices, on the other hand, may be broadcast less frequently (e.g. weekly instead of daily), thereby creating a longer delay until download may be available. The longer delays, however, can be limited to the least popular programs, thereby reducing the wait times experienced by the majority of consumers. In many embodiments, voting can be used to set other broadcast parameters such as standard vs. high definition so that the majority of available bandwidth is efficiently used for the benefit of a greater number of consumers, while still allowing less popular choices to be made available, albeit at a lower resolution and/or frequency.

The information contained within queues 122 and 124 can therefore be used to create an efficient uplink signal 129 that is ultimately broadcast as signal 131 to the various consumer devices 102. In the embodiment shown in FIG. 1, an uplink control system 126 suitably creates appropriate uplink signals 129 that includes instructions 132 to particular devices 102 that are formulated in response to queue 122, in addition to programming content from database 127 that is formulated and scheduled in accordance with queue 124. In a satellite-based embodiment such as that of FIG. 1, uplink signal 129 is typically provided to an antenna 128 that transmits the signal 131 to a geo-synchronous or other satellite 130. Satellite 130 then repeats the signal 131 toward the Earth for reception by the various consumer devices 102. Equivalent embodiments may use cable-based or terrestrial wireless distribution in place of satellite distribution.

In operation, then, consumers are able to efficiently obtain preferred content via a satellite or other high-bandwidth link 131 through the use of separate back-channel voting. Consumers cast votes 115 via a telephone 114, computer 116 and/or other channel 112 that is separate from the high-bandwidth link 131. The votes 115 are received at an interface 120 associated with a service center 118 that processes billing (e.g. at billing system 123) as appropriate, and which tallies votes 115 to create a voter queue 122 of programs to be downloaded to particular consumer devices 102 associated with the voting consumers. Votes may also be used to create a programming schedule or other queue 124 so that the most popular programs are broadcast most frequently, most conveniently, or otherwise for the benefit of the greatest number of voting consumers. The program queue 124 is then transmitted as a portion of the high-bandwidth link 131 (e.g. as one or more programming channels that can be received by devices 102), along with associated instructions 132 to particular devices 102 to receive and/or record the appropriate programs. After the device 102 receives the selected programs, the voting consumer is able to watch the programs on a display 110 and/or to retain the program in storage 106 for subsequent viewing in accordance with a subscription plan or other business logic as appropriate.

Turning now to FIG. 2, an exemplary process 200 for distributing programs based upon consumer preferences suitably includes the broad steps of receiving votes 115 requesting access to particular content from one or more consumers (step 204), allocating at least a portion of the high-bandwidth link 131 to programs indicated in the votes 115, and subsequently transmitting the requested content (step 212), as well as instructions (step 210) that allow the consumer device 102 to receive the requested content via the high-bandwidth signal 131. Some or all of the various steps shown in FIG. 2 may be automated using, for example, a digital computer executing programming instructions in any compiled or interpreted language. Such instructions may be stored in any digital media, including any sort of read-only or writable memory, magnetic or optical mass storage, or the like. Alternately, certain steps of process 200 may be partially or entirely implemented manually by human operators, with the results of the steps being input into one or more digital computers for subsequent processing. In various embodiments, process 200 is implemented using a system of inter-connected digital computers and other systems at a service center 118, as described more fully above.

Process 200 suitably begins by registering consumers (step 202). To effectively obtain selected programs, system 100 typically needs sufficient information to link votes 115 that are received with instructions 132 provided to a particularly consumer device 102, and to process any applicable billing.

To that end, registration step 202 involves any manual or automatic gathering of needed information. Registration may involve a consumer contacting a web server or phone operator, for example, to provide information about acceptable sources for casting votes (e.g. phone numbers, computers, email or instant message accounts, and/or the like), and information that allows identification of a device 102 associated with the consumer. Many content aggregators will already have sufficient information to allow voting without additional action by the consumer; alternately, however, consumers may be invited to contact a human or machine source to register for the service and/or to provide any appropriate information. Again, any manual or automated technique that allows received votes 115 to be correlated to instructions 132 provided to any particular consumer device 102 is sufficient.

After registration is complete, consumers are allowed to cast votes 115 for selected programs (step 204). Votes 115 are received in any manner; as described above, votes may be sent via telephone, text message, email, instant message, web-based or other internet messaging, or any other media. Votes 115 in this instance are any messages or other data packets capable of identifying a particular program and a consumer that is casting the vote. Votes 115 may be used to specifically request access to the indicated program, or may be simply used to indicate a preference for the indicated programming, as appropriate.

In embodiments wherein votes are aggregated over time, additional votes may be received (step 206). As noted above, certain embodiments may allocate bandwidth on the high-bandwidth link 131 in response to votes received (step 208). That is, the most popular programs indicated by the aggregated voting can be made most readily available or otherwise given priority over less popular programs. In other embodiments, however, step 208 is implemented prior to voting steps 204 and 206 such that consumers are allowed to select programs that are already determined to be broadcast. In this latter embodiment, broadcast content need not be dynamically adjusted based upon the voting; to the contrary, voting is simply used to request access to the content indicated in the vote 115. In embodiments wherein broadcast content is dynamically adjusted based upon voting, a program queue 124 such as that described in conjunction with FIG. 1 may be used to implement any desired prioritization and scheduling scheme.

After votes are cast, process 200 suitably allows programs to be received for subsequent viewing as appropriate. Programs indicated in consumer votes 115, for example, can be associated with instructions 132 that are provided to the consumer's associated device 102 via the high-bandwidth link 131 (step 210). These instructions may be scheduled according to a voter queue 122, as described above, or according to any other techniques. In various embodiments, instructions 132 include the identifier associated with the particular consumer device 102, as well as any commands to be carried out by the device 102 and any cryptographic keys and/or other data needed to implement the various commands. Instructions 132 may be further coordinated in conjunction with any desired billing and/or subscription plan. After instructions 132 are sent to the appropriate consumer devices 102, the selected content can be transmitted on link 131 (step 212). Consumer devices 102 may then execute the received instructions 132 to receive, store and/or otherwise process content that is received.

FIG. 3 shows one process 300 wherein the content delivery system 100 can be used to implement a subscription-based service. In such embodiments, consumers are able to obtain multiple programs on a flat fee or other reasonable compensation basis. Process 300 may be implemented in hardware, software or other logic in conjunction with any digital computer system, such as the billing system 123 and/or queuing system 125 shown in FIG. 1.

As shown in FIG. 3, a subscription-based service monitors votes received from each consumer (step 302, which generally parallels step 204 described above). Generally, subscription-based consumers will be able to receive a limited number of downloads over a particular time period (e.g. a set number of downloads per week/month), or a limited number of downloads that can be maintained within device 102 at any particular time. In this latter instance, for example, a consumer may pay a flat monthly fee for access to a particular number of concurrent programs in storage 106. If the consumer casts enough votes to exceed the limited number of downloads (step 304), the excess can be addressed in any appropriate manner (step 306). In various embodiments, the consumer may be provided with a prompt in any media to enlarge the subscription to accommodate additional programs. This may be accomplished by, for example, sending an instruction 132 to the consumer's device 102 to generate a pop-up window or other notification. Alternatively, the prompt may be sent via email, text message, telephone call or any other convenient media accessible to the consumer.

In other embodiments, consumers may be prompted to pay a one-time fee for exceeding the subscription limits. If the consumer has paid for three downloads, for example, but wishes to receive a fourth download, the consumer may pay an additional fee to accommodate the additional download on a one-time basis. The consumer may be prompted to enlarge the subscription using any of the techniques described above.

In still other embodiments, requested downloads are queued (e.g. in voter queue 122) until the consumer device 102 is able to accommodate additional programs. In such embodiments, the consumer may be provided with a notification (e.g. via a web page, an instruction 132 to device 102, or any other media) that additional downloads will be queued until previously-downloaded programs are viewed or removed from storage. Such notification may be processed within device 102, which is aware of the number of programs maintained in storage 106; upon receipt of an instruction 132 to download additional programs, device 102 may refuse to do so until the consumer frees up additional resources as required by a user agreement or other terms of the subscription-based service.

Alternatively, consumer device 102 may be instructed to remove one or more programs to accommodate additional downloads. The removal may take place in response to an instruction 132 from service center 118, or in response to a user-supplied command received at consumer device 102. Programs may be automatically removed after a period of time (e.g. one month) or after a period of time in which the program has not been viewed. Removal may occur after confirming with the consumer that removal is acceptable or desired in some instances, or may take place without consumer approval if the removal of the program is needed to conform to licensing requirements, terms of service or other legal requirements. As the consumer regains ability to download additional programs, the queue of programs stored in device 102 may be updated as appropriate (step 308). Program download may resume as described in FIG. 2, for example, or in any other manner.

The basic processes shown in FIGS. 2 and 3 may be supplemented or modified in many different ways. Billing, for example, may be incorporated into steps 202, 204, 210, 212 and/or 304 in any manner. Consumers may be billed on a monthly, annual or other periodic basis for use of the system 100, for example. Alternately, consumers may be billed on a per vote and/or per download basis, as noted above. In still other embodiments, instructions 132 and/or downloaded programs are supplemented with advertisements such that consumers are requested or required to view the advertisements prior to viewing the downloaded content. Viewing of advertisements may be in addition to or in place of monetary charges imposed any portion of the voting service. In still other embodiments, a content aggregator or other service provider may give consumers a limited number of votes, download credits and/or the like at little or no charge in exchange for loyalty to a particular product or service, purchases of other related or unrelated goods or services, or additional information about the consumer. In the latter case, for example, a consumer may be provided with additional credits in exchange for providing opinions (e.g. in an online review) of downloaded content. In still further embodiments, an additional charge could be imposed to allow long term storage of downloaded content, storage of content on external media, and/or the ability to write the content to a writable media (e.g. a writable digital versatile disk (DVD)) for subsequent playback. Again, any sort of billing or other value scheme could be used across a wide array of equivalent embodiments.

The above disclosure therefore provides a number of systems and processes for delivering consumer-preferred content over a high-bandwidth link, such as a satellite link. By allowing voting for content via channels other than the high-bandwidth link itself, the problems associated with prior art back channel communications are overcome. However, voting over a high-bandwidth link may also be provided for in various embodiments. Various embodiments ensure that limited bandwidth is used most effectively by allocating at least a portion of the high-bandwidth connection based upon the consumer votes so that the most popular programs receive greatest priority. Further, various embodiments allow a number of billing and subscription options so that a content aggregator or other service provider can extract significant value from the content delivery system.

While at least one exemplary embodiment has been presented in the foregoing detailed description, it should be appreciated that a vast number of alternate but equivalent variations exist. Although the systems and techniques described herein are frequently described with respect to satellite-based implementations, for example, similar concepts could be readily applied with cable, telephone, wireless and/or any other methods of content delivery.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method of distributing a plurality of requested programs for playback by a particular consumer device via a high-bandwidth connection, the method comprising the steps of:
   receiving a plurality of votes for each of the plurality of requested programs via a communications channel other than the high-bandwidth connection prior to broadcast of the requested programs;
   selecting only a subset of the plurality of requested programs for broadcast, wherein the selecting is based upon a number of votes received for each of the plurality of programs prior to the broadcast of the requested programs;
   allocating a portion of the high-bandwidth connection to broadcast the subset of the plurality of requested programs over the high bandwidth connection in a downloadable format that can be downloaded and stored at the consumer device; and
   responsive to receiving the vote for one of the requested programs in the broadcast subset, transmitting an instruction to the particular consumer device via the high-bandwidth connection that allows the particular consumer device access to the requested program after the program is downloaded to the particular consumer device separately from the instruction via the allocated portion of the high-bandwidth connection.

2. The method of claim 1 wherein the communications channel is selected from the group consisting of a telephone call, a text message, an email, and an internet message.

3. The method of claim 1 wherein the allocating step is performed responsive to the receiving step.

4. The method of claim 1 wherein the allocating step is performed such that those programs receiving a greater number of votes receive higher priority in the portion of the high-bandwidth connection.

5. The method of claim 1 further comprising accepting a fee associated with the vote.

6. A system for distributing a plurality of programs to a plurality of consumer devices associated with a plurality of users via a high-bandwidth connection, the system comprising:
   an interface to a communications channel separate from the high-bandwidth connection, wherein the interface is configured to receive votes for the plurality of programs, wherein each of the votes identifies one of the plurality of programs and is provided by one of the plurality of users, and wherein the votes are received prior to broadcast of the programs;
   a queuing system configured to allocate a portion of the high-bandwidth connection for download of only a subset of the plurality of programs for broadcast to the plurality of consumer devices, wherein the programs in the subset are determined based upon the number of votes received for each of the plurality of programs prior to the broadcast of the requested programs; and
   an uplink control system configured to broadcast the subset of the plurality of programs on the allocated portion of the high-bandwidth connection for reception by the consumer devices, and to transmit, responsive to each vote, an instruction to a particular consumer device associated with the user that provided the vote to thereby allow the particular consumer device to access the downloaded program identified in the vote and downloaded separately from the instruction.

7. The system of claim 6 wherein the queuing system comprises a program queue configured to identify the most popular programs in the plurality of programs based upon the votes received.

8. The system of claim 7 wherein the queuing system further comprises a voter queue configured to associate votes received for particular programs with particular consumer devices.

9. The system of claim 7 wherein the uplink control system is further configured to select the subset of programs for broadcast on the allocated portion of the high bandwidth connection according to the program queue such that the programs receiving the most votes are broadcast most frequently.

10. The system of claim 6 further comprising a billing subsystem configured to maintain a subscription service for each of the plurality of consumer devices.

11. The system of claim 10 wherein the subscription service is configured to allow each of the plurality of consumer devices to maintain a limited number of programs received via the portion of the high-bandwidth connection.

12. The system of claim 6 wherein the instruction is transmitted to the consumer device via the high bandwidth connection.

13. The system of claim 12 wherein the communications channel is selected from the group consisting of a telephone call, a text message, an email, a text message and a web-based message.

14. A method of distributing a plurality of programs to a plurality of consumer devices via a high-bandwidth connection, the method comprising the steps of:
  receiving a plurality of votes for each of the plurality of programs via a communications channel separate from the high-bandwidth connection, wherein the votes are received prior to broadcast of the programs;
  allocating a portion of the high-bandwidth connection to broadcasting only a subset of the plurality of programs selected based upon the plurality of votes received for each of the plurality of programs prior to the broadcast, wherein the high-bandwidth connection broadcasts the plurality of programs for downloading to the plurality of consumer devices; and
  transmitting instructions to each of the plurality of consumer devices via the high-bandwidth connection, wherein each of the plurality of consumer devices receives its own instruction to thereby allow each of the plurality of consumer devices to access selected ones of the subset of programs downloaded via the allocated portion of the high-bandwidth connection, wherein the selected ones of the subset of programs are each associated with votes submitted by consumers of the particular consumer devices.

15. The method of claim 14 further comprising the step of maintaining a subscription service for each of the plurality of consumer devices.

16. The method of claim 15 wherein the subscription service is configured to allow each of the plurality of consumer devices to maintain a limited number of programs downloaded via the portion of the high-bandwidth connection to the consumer device.

17. The method of claim 16 wherein the subscription service is further configured to allow consumer devices to exceed the limited number of programs maintained on the consumer device for an additional charge.

18. The method of claim 16 wherein the subscription service is further configured to instruct one of the plurality of consumer devices to no longer maintain a received program in response to a request to exceed the limited number of programs maintained on the consumer device.

19. The method of claim 14 further comprising the step of receiving a fee for each of the plurality of votes received.

20. The method of claim 14 wherein the instructions are configured to present an advertisement to the consumer of the consumer device prior to viewing the selected ones of the plurality of programs.

* * * * *